A. R. DAVIDSON.
NAIL BRUSH.
APPLICATION FILED MAR. 2, 1917.

1,309,510.

Patented July 8, 1919.

Inventor
Adam R. Davidson

Witness
W. May. Duvall

By Victor J. Evans
Attorney

UNITED STATES PATENT OFFICE.

ADAM R. DAVIDSON, OF BEDFORD, INDIANA.

NAIL-BRUSH.

1,309,510.   Specification of Letters Patent.   Patented July 8, 1919.

Application filed March 2, 1917. Serial No. 152,068.

*To all whom it may concern:*

Be it known that I, ADAM R. DAVIDSON, a subject of the King of Great Britain, residing at Bedford, in the county of Lawrence and State of Indiana, have invented new and useful Improvements in Nail-Brushes, of which the following is a specification.

The present invention relates to a toilet article, and is designed to present a novel construction of nail brushes.

In carrying out my invention, it is my purpose to produce an article of this character embodying a casing of a shape convenient to be grasped in one hand of an operator and having mechanism therein adapted to be actuated by the thumb of the operator for revolving the brush which has one of its ends partly projected within the casing, so that by transferring the device from one hand to the other the nails of both of the hands may be operated upon.

It is a further object of the invention to journal within a suitable casing shafts, each having meshing toothed wheels and one of the shafts carrying a brush which is partly projected through a suitable opening in the casing, the other shaft having loosely journaled thereon a connected ratchet wheel and pinion, and the toothed wheel carried by the said shaft having pivoted thereto a jaw which co-acts with the teeth of the ratchet wheel, while projecting through the casing is a headed end of a rack bar which meshes with the pinion and which is under the influence of a spring, so as to normally retain the same in one position with relation to the casing whereby the head of the rack bar will be returned to operative position after pressure thereon has been released and whereby a continuous rotary movement will be imparted to the brush by the pressure upon the head of the rack bar.

With the above and other objects in view, the improvement resides in the construction, combination and arrangement of parts set forth in the following specification and falling within the scope of the appended claim.

Figure 1:
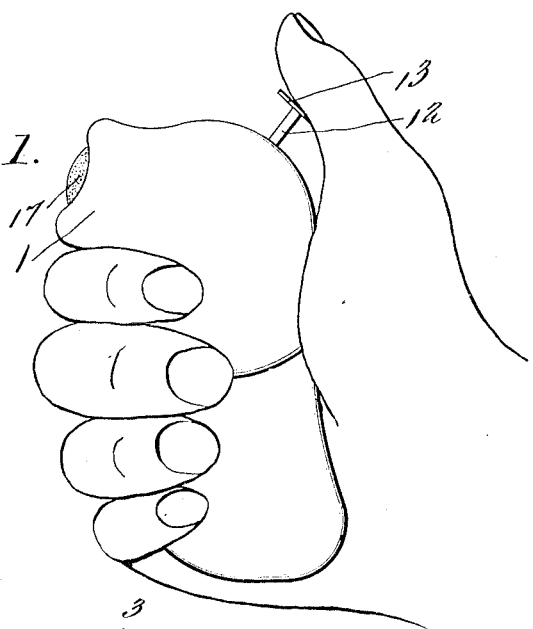
Figure 1 is a view illustrating the method of operating my improvement.
Figure 2:
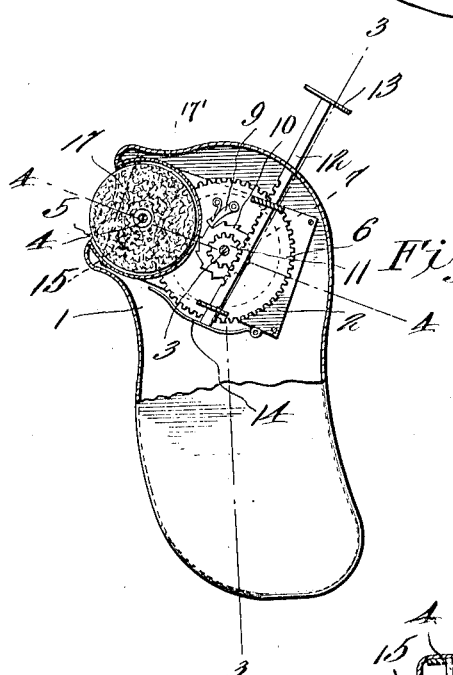
Fig. 2 is a side elevation of the same, part being broken away and part being shown in section.
Figure 3:
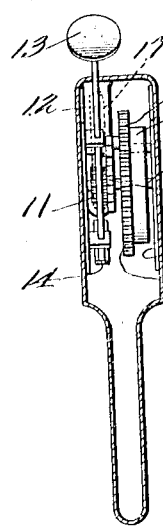
Fig. 3 is a sectional view approximately on line 3—3 of Fig. 2.
Figure 4:
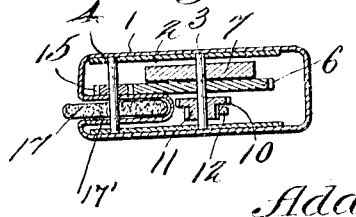
Fig. 4 is a perspective view approximately on line 4—4 of Fig. 2.

As disclosed by the drawing, the improvement contemplates the employment of a suitable casing 1 which may be of any desired material but is so shaped that the same may be conveniently grasped by an operator. Secured within the casing 1, adjacent what I will term the upper portion thereof is a frame 2 upon which are journaled two spaced shafts 3 and 4 respectively. The shaft 4 is disposed adjacent to one of the end walls of the casing, and the said end wall is provided with an aperture or opening 5 disposed opposite the said shaft. Upon the shaft 3 is secured a comparatively large toothed wheel 6, and likewise upon the said shaft is secured a balance wheel 7. Pivotally secured to the toothed wheel 6 is a spring pressed dog 9 which is adapted to engage with the teeth of the ratchet wheel 10 that is loosely journaled upon the shaft 3, and that has secured to one side thereof a pinion 11. Journaled in suitable openings in the frame 2 and passing through an opening in the top wall of the casing 1 is a rack bar 12 which has its outer end provided with a knob or handle 13 and which has its inner end contacted by a spring 14 whereby the rack bar is normally sustained in one position. Upon the second shaft 4 is secured a comparatively small toothed wheel or pinion 15 which meshes with the toothed wheel 6, and upon the said shaft 4 is also secured the body portion of a rotary brush 17 that is partially projected through the opening 5 in the casing.

I prefer to form the casing of such a shape that it will fit the hand of the user with the head 13 in position to be pressed upon by the thumb, and the projecting portion carrying the brush 17 above the fore-finger so that the nails on the other hand may be readily placed against said brush. I form a chamber 17′ in said projecting portion which is provided with an opening at the extreme edge of said portion and this chamber receives the brush, the shaft 4 of which passes through the walls of said chamber.

The actuation of the device will, it is thought, be readily apparent. A downward pressure is exerted upon the head or knob of the rack bar by the thumb of the operator which revolves the pinion, the ratchet wheel, and through the medium of the dog 9 the large toothed wheel 6, which in turn imparts a rotary motion to the toothed wheel upon the shaft 4 revolving the brush 17. When pressure upon the knob or head 13 is released the spring 14 returns the rack bar to its initial position without influencing the toothed wheel 6 which, through the medium of the balance wheel 7 will, for a determined period, continue the motion imparted thereto by the said downward movement of the rack bar. A continued pressure in a downward direction is imparted to the rack bar in the operation of the device.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what is claimed as new, is:

In a device for the purpose set forth, the combination with a casing of a size to be grasped by the hand of an operator, of spaced shafts journaled in the casing, meshing toothed wheels upon each of the shafts, a balance wheel upon one of the shafts, a ratchet wheel loosely journaled upon this shaft, a pinion secured to the ratchet wheel, a spring pressed dog upon the toothed wheel carried by the said shaft engaging with the ratchet wheel, a longitudinally movable rack bar slidingly mounted in the casing and projecting therethrough and co-engaging with the teeth of the pinion, spring means engaging with the end of the rack-bar for returning the same to normal position, a head upon the outer end of the rack bar, and a rotary brush upon the second shaft having a portion projecting from the casing.

In testimony whereof I affix my signature.

ADAM R. DAVIDSON.